(12) United States Patent  
Nakakubo

(10) Patent No.: US 6,471,612 B2
(45) Date of Patent: Oct. 29, 2002

(54) CLOSED HYDRAULIC TENSIONER

(75) Inventor: Katsuya Nakakubo, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/759,569

(22) Filed: Jan. 12, 2001

(65) Prior Publication Data

US 2001/0007841 A1 Jul. 12, 2001

(30) Foreign Application Priority Data

Jan. 12, 2000 (JP) ........................................ 2000-003819

(51) Int. Cl.⁷ .............................. F16H 7/08; F16H 7/22
(52) U.S. Cl. ...................................... 474/110; 474/109
(58) Field of Search ................................. 474/110, 138, 474/109–111, 101, 136

(56) References Cited

U.S. PATENT DOCUMENTS 4,911,679 A * 3/1990 Inoue et al. ................ 474/110
5,087,225 A * 2/1992 Futami et al. .............. 474/110
5,383,813 A * 1/1995 Odai ........................... 474/110
5,538,478 A * 7/1996 Nakakubo et al. .......... 474/110
5,833,220 A * 11/1998 Nakakubo et al. .......... 474/110

FOREIGN PATENT DOCUMENTS

| JP | 0379843 A | * | 4/1991 | ............. 474/110 |
| JP | 09166190 A | * | 6/1997 | |
| JP | 10141453 | * | 5/1998 | |

* cited by examiner

Primary Examiner—David A. Bucci
Assistant Examiner—Marcus Charles
(74) Attorney, Agent, or Firm—Dann, Dorfman, Herrell and Skillman; Henry H. Skillman

(57) ABSTRACT

A closed hydraulic tensioner has a high-pressure chamber, a low-pressure chamber and a reservoir that are previously filled with an oil sealed in the hydraulic tensioner. The hydraulic tensioner further has a pressure chamber disposed next to said reservoir with a movable member disposed therebetween so as to displace the movable member toward the reservoir to thereby pressurize the oil inside the reservoir. The pressure chamber is supplied with an oil from the exterior of the tensioner.

1 Claim, 5 Drawing Sheets

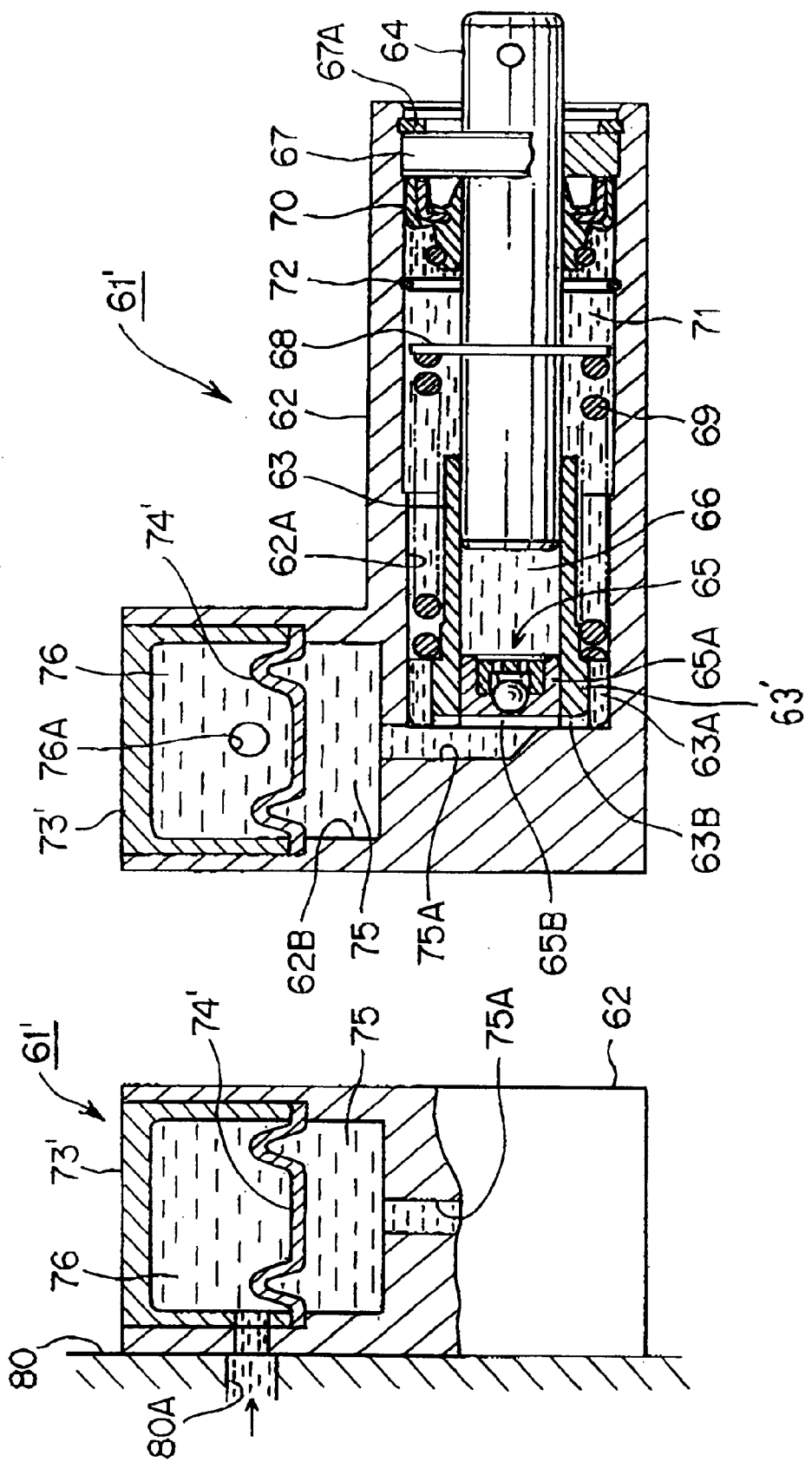

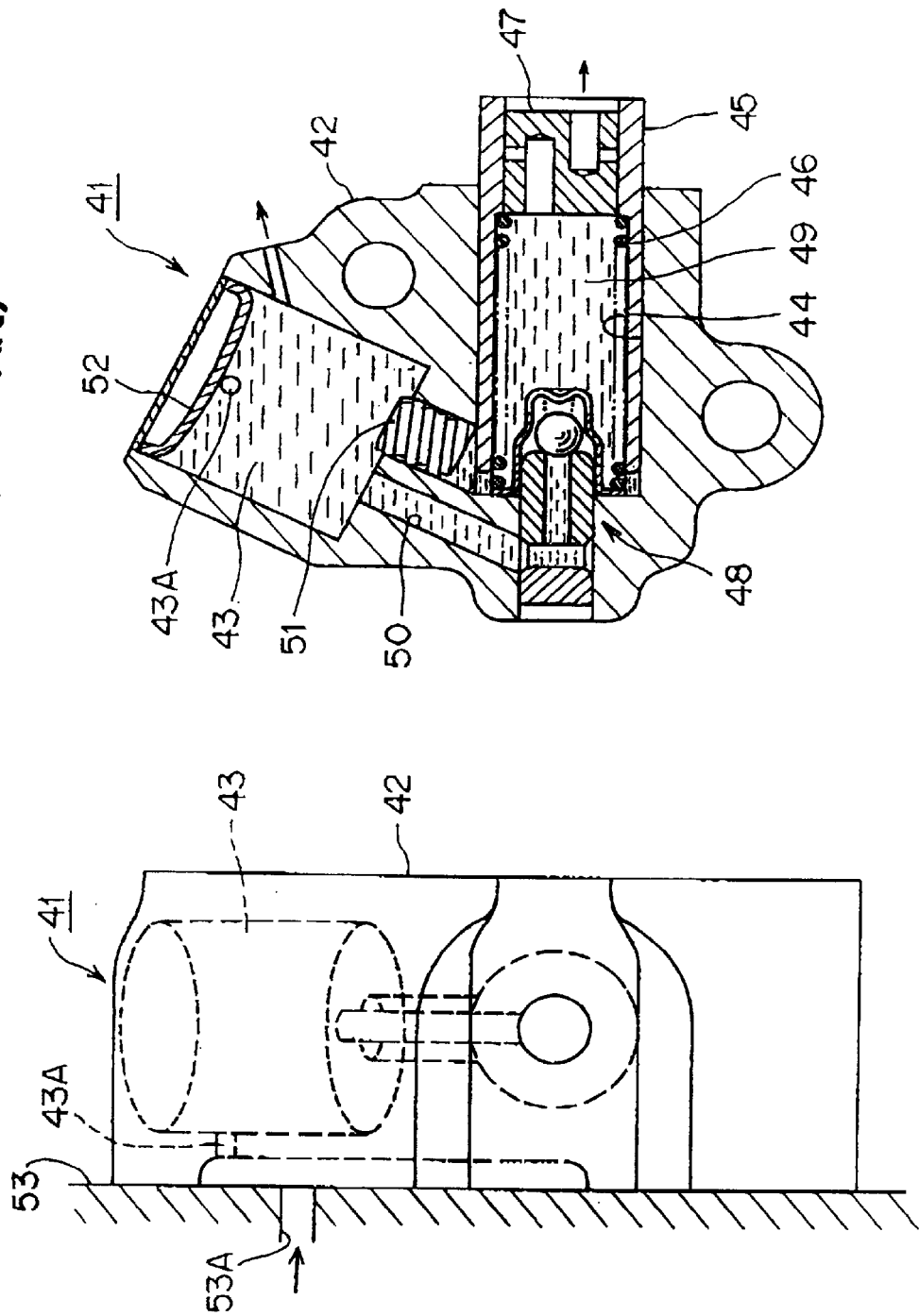

CLOSED HYDRAULIC TENSIONER

BACKGROUND OF THE INVENTION

1. Field of the Invention

The present invention relates to a closed hydraulic tensioner used for applying an appropriate tension to a timing belt or a timing chain of an automobile engine.

2. Description of the Related Art

Hydraulic tensioners used to apply an appropriate tension to a timing chain or belt of an automobile engine include a closed hydraulic tensioner having an oil previously sealed therein, and an open hydraulic tensioner containing an oil supplied from an oil pump of the engine. The latter-mentioned open hydraulic tensioner further includes a reservoir-equipped type hydraulic tensioner in which an oil supplied from the oil pump is stored in a reservoir provided in the tensioner.

FIG. 3 is a longitudinal cross-sectional view showing one example of the conventional closed hydraulic tensioners. The hydraulic tensioner 1 shown in FIG. 3 comprises a housing 2, a flanged cylinder 3 mounted in the housing 2, and a piston rod 4 slidably fitted in the cylinder 3 from an end thereof, with a small clearance defined between the cylinder 3 and the piston rod 4. A ball seat 5A forming part of a check valve 5 is press-fitted in the opposite end of the cylinder 3 so that a high-pressure chamber 6 is defined interiorly of the cylinder 3. A circular rod guide 7 has an axial connecting hole 7A formed therein and is mounted on the piston rod 4 by means of a stop ring 7B. By the rod guide 7, the piston rod 4 is aligned with the axis of the cylinder 3. A compression coil sprig 8 is disposed in a pre-loaded or compressed condition between a flange of the flanged cylinder 3 and the rod guide 7 so that the spring 8 urges the piston rod 4 in a direction to project outward from the housing 2.

The housing 2 has an intermediate partition wall 2A. The flanged cylinder 3 is disposed on a forward side of the partition wall 2A within the housing 2. An oil seal 9 and a dust seal 10 are disposed between an outer circumferential surface of the piston rod 4 and an inner circumferential surface of the housing 2. The piston rod 4, the flanged cylinder 3, the housing 2 and the oil seal 9 jointly define therebetween a space and this space forms a low-pressure chamber 11. A second stop ring 12 is attached to the inner circumferential surface of the housing 2 at a position behind the oil seal 9. The stop ring 12 limits the forward stroke of the rod guide 7. The partition wall 2A has a central oil passage 2B and a connecting passage 2C located radially upward of the oil passage 2B. The flange of the flanged cylinder 3 has two axial oil passages 3A formed in an outer circumferential surface thereof and spaced at an angle of 180 degrees. The flanged cylinder 3 further has a radial oil passage 3B formed in an end face thereof which is held in abutment with the partition wall 2A. The housing 2 further has a reservoir 15 formed on the rearward side of the partition wall 2A. The reservoir 15 is defined by a diaphragm 14 attached to the housing 2 by means of a diaphragm clamp 13. The diaphragm 14 is urged toward the reservoir 15 by means of a loading spring 18. The high-pressure chamber 6, low-pressure chamber 11 and the reservoir 15 are previously filled with an oil. The low-pressure chamber 11 communicates with the reservoir 15 through the oil passages 3A and 3B and the connecting passage 2C.

In operation, when a shoe (not shown) is subjected to an impact force applied from a belt or a chain (not shown), the piston rod 4 moves backward against the force of the spring 8. With this backward movement of the piston rod 4, the hydraulic pressure within the high-pressure chamber 6 increases to thereby close the check valve 5. Thus, the oil inside the high-pressure chamber 4 leaks out to the low-pressure chamber 11 through the small clearance between the outer circumferential surface of the piston rod 4 and the inner circumferential surface of the flanged cylinder 3. During that time, the impact force applied to the shoe from the belt or chain is dampened or otherwise absorbed by a flow resistance produced when the oil passes through the small clearance.

When the piston rod 4 moves forward in the projecting direction under the force of the spring 8, the oil inside the reservoir 15 is introduced into the high-pressure chamber 6 through the check valve 5. In this instance, since the amount of oil held inside the reservoir 15 decreases, the diaphragm 14 is displaced toward the reservoir 15 side by the force of the loading spring 18 to thereby follow up the change in content volume of the reservoir 15.

FIG. 4 is a longitudinal cross sectional view showing another example of the conventional closed hydraulic tensioners. The hydraulic tensioner 21 includes a housing 22 in the form of a bottomed cylinder, a plunger 26 slidably fitted in the cylindrical housing 22 and having one end facing toward the bottom of the housing 22 with a first oil chamber 23 defined therebetween, the plunger 26 having the opposite end facing a second oil chamber 24 and being urged by a spring 25 toward the second oil chamber 24, a rod portion 27 formed integrally with the plunger 26 and projecting outward from the housing 22, a free piston 31 sealed from the rod portion 27 by means of an oil seal 28 and slidably fitted in the cylindrical housing 22 via a packing 29, the free piston 31 having one end facing the second oil chamber 24 and being urged by a loading spring 30 toward the second oil chamber 24, and an oil passage 33 formed in the plunger 26 and equipped with a check valve 32 which allows the oil to flow from the second oil chamber 24 into the first oil chamber 23 and blocks reverse flow of the oil.

In operation, when the tension in a belt or a chain (not shown) increases, the load exerted via the rod portion 27 onto the plunger 26 increases to thereby increase the hydraulic pressure within the first oil chamber 23. With this pressure rise, the oil inside the first oil chamber 23 flows through a small clearance between the plunger 26 and the housing 22 into the second oil chamber 24, thereby permitting the plunger 26 to move backward. With this backward movement of the plunger 26, the increased tension in the belt or chain is absorbed. In this instance, the free piston 31 moves forward to an extent corresponding to the amount of oil flown into the second oil chamber 24.

When the tension in the belt or chain decreases, the force or pressure applied to the rod portion 27 decreases. Accordingly, the plunger 26 moves forward by the force of the spring 25 to thereby cancel out the reduction in tension of the belt or chain. In this instance, the oil in the second oil chamber 24 flows through the oil passage 33 and the check valve 32 into the first oil chamber 23, and the loading spring 30 moves the free piston 31 backward by a distance corresponding to the amount of oil flown out from the second oil chamber 24.

FIG. 5A is a side view illustrating one example of the conventional reservoir-equipped hydraulic tensioners, and FIG. 5B is a front cross-sectional view of the hydraulic tensioner. As shown in these figures, the reservoir-equipped hydraulic tensioner 41 includes a housing 42 having formed therein a reservoir 43 open upward and a plunger accommodating hole 44 (FIG. 5B) extending in a horizontal direction with respect to the reservoir 43. A hollow plunger 45 having an open inner end is slidably inserted into the plunger accommodating hole 44 and resiliently urged by a spring 46 in a direction to project from the housing 42. An outer end (projecting end) of the hollow plunger 45 has an orifice 47. A check valve 48 is provided at the bottom of the plunger accommodating hole 44. The plunger accommodating hole 44 and the hollow plunger 45 jointly form a pressure chamber 49. The reservoir 43 and the check valve 48 communicate with each other via an oil passage 50. The reservoir 43 and the pressure chamber 49 communicate with each other via a second orifice 51. An open end of the reservoir 43 is closed by a plug 52. With this arrangement, an oil from an oil pump (not shown) of an engine is supplied from an oil path 53A of an engine block 53 through an oil supply hole 43A into the reservoir 43. The oil is subsequently supplied successively through the oil passage 50 and the check valve 48 into the pressure chamber 49.

The conventional closed hydraulic tensioner 1 shown in FIG. 3 has a problem, however, that since the diaphragm 14 requires the loading spring 18, the overall size of the housing 2 becomes large due to the necessity of providing a space for accommodating the loading spring 18.

The conventional closed hydraulic tensioner 21 shown in FIG. 4 also has a problem that the housing 22 is rendered large in size due to the necessity of providing a space for accommodating the loading spring 30 used for urging the free piston 31.

The conventional reservoir-equipped hydraulic tensioner shown in FIGS. 5A and 5B has a problem that since the tensioner is supplied with an oil from an engine, the engine must have a large-capacity oil pump and may encounter deterioration of performance characteristics of engine parts when a hydraulic pressure drop occurs. Thus, it is highly desirable that the oil in the engine is not consumed.

SUMMARY OF THE INVENTION

In view of the foregoing problems of the prior art devices, an object of the present invention is to provide a closed hydraulic tensioner which is capable of securing smooth flow of oil into a high-pressure chamber and a low-pressure chamber, is able to block mixing of outside air into the oil, can achieve a sufficient damping performance, is able to reduce the number of components used, and can reduce the overall size and weight of the tensioner.

To achieve the foregoing object, the present invention provides a closed hydraulic tensioner comprising a high-pressure chamber, a low-pressure chamber and a reservoir, the high-pressure chamber, the low-pressure chamber and the reservoir being previously filled with an oil sealed in the hydraulic tensioner, the improvement comprising: a pressure chamber disposed next to the reservoir with a movable member disposed therebetween so as to displace the movable member toward the reservoir to thereby pressurize the oil inside the reservoir, the pressure chamber being supplied with an oil from the exterior of the tensioner.

In one preferred form of the invention, the closed hydraulic tensioner comprises: a housing having a first blind hole and a second blind hole extending at an angle to the first blind hole, the second blind hole having an open end facing upward; a cylinder mounted in the first blind hole in the housing; a piston rod having one end portion slidably fitted in the cylinder with a small clearance defined therebetween and the opposite end portion projecting outward from the housing; a spring acting between the cylinder and the piston rod to urge the piston rod in one direction to project from the housing; an oil seal disposed between an outer circumferential surface of the piston rod and an inner circumferential surface of the first blind hole in the housing, there being defined between the housing, the cylinder, the piston rod and the oil seal a low-pressure chamber; a check valve provided at one end of the cylinder so as to define, jointly with the cylinder and the one end of the piston rod, a high-pressure chamber; an end plug fitted in the second blind hole to close the open end of the second blind hole; and a movable member disposed in the second blind hole and separating the interior of the second blind hole into a reservoir on one side of the movable member and a pressure chamber on the other side of the movable member. The low-pressure chamber, the high-pressure chamber and the reservoir are previously filled with an oil sealed in the hydraulic tensioner. The reservoir communicates with the low-pressure chamber and also communicates with the high-pressure chamber via the check valve. The pressure chamber is supplied with an oil from the exterior of the hydraulic tensioner. The movable member is displaceable toward the reservoir under the pressure in the pressure chamber when the oil in the reservoir is caused to flow into the low-pressure chamber in response to movement of the piston rod in the one direction.

The movable member may comprise a free piston disposed in the second blind hole or a diaphragm mounted in the second blind hole.

When the piston rod moves backward against the force of the spring, the hydraulic pressure in the high-pressure chamber increases to thereby close the check valve. Thus, the oil in the high-pressure chamber leaks out to the low-pressure chamber through the small clearance between the outer circumferential surface of the piston rod and the inner circumferential surface of the cylinder. The oil, as it passes through the small clearance between the piston rod and the cylinder, creates a flow resistance which acts to dampen or absorb an impact force applied to the piston rod from a belt or a chain.

When the piston rod moves forward in the projecting direction by the force of the spring, the oil inside the reservoir is introduced through the check valve into the high-pressure chamber. In this instance, since the amount of oil held inside the reservoir decreases, the movable member moves toward the reservoir under the action of hydraulic pressure inside the pressure chamber, thereby following up the change in content volume of the reservoir.

BRIEF DESCRIPTION OF THE DRAWINGS

FIG. 2A is a side view, with parts broken away for clarity, of a closed hydraulic tensioner according to a second embodiment of the present invention;

FIG. 2B is a longitudinal cross-sectional view of the hydraulic tensioner shown in FIG. 2A;

FIG. 5A is a side view of a conventional reservoir-equipped hydraulic tensioner; and FIG. 5B is a front sectional view of the hydraulic tensioner shown in FIG. 5A.

DETAILED DESCRIPTION OF THE PREFERRED EMBODIMENTS

Figures 1A, 1B:
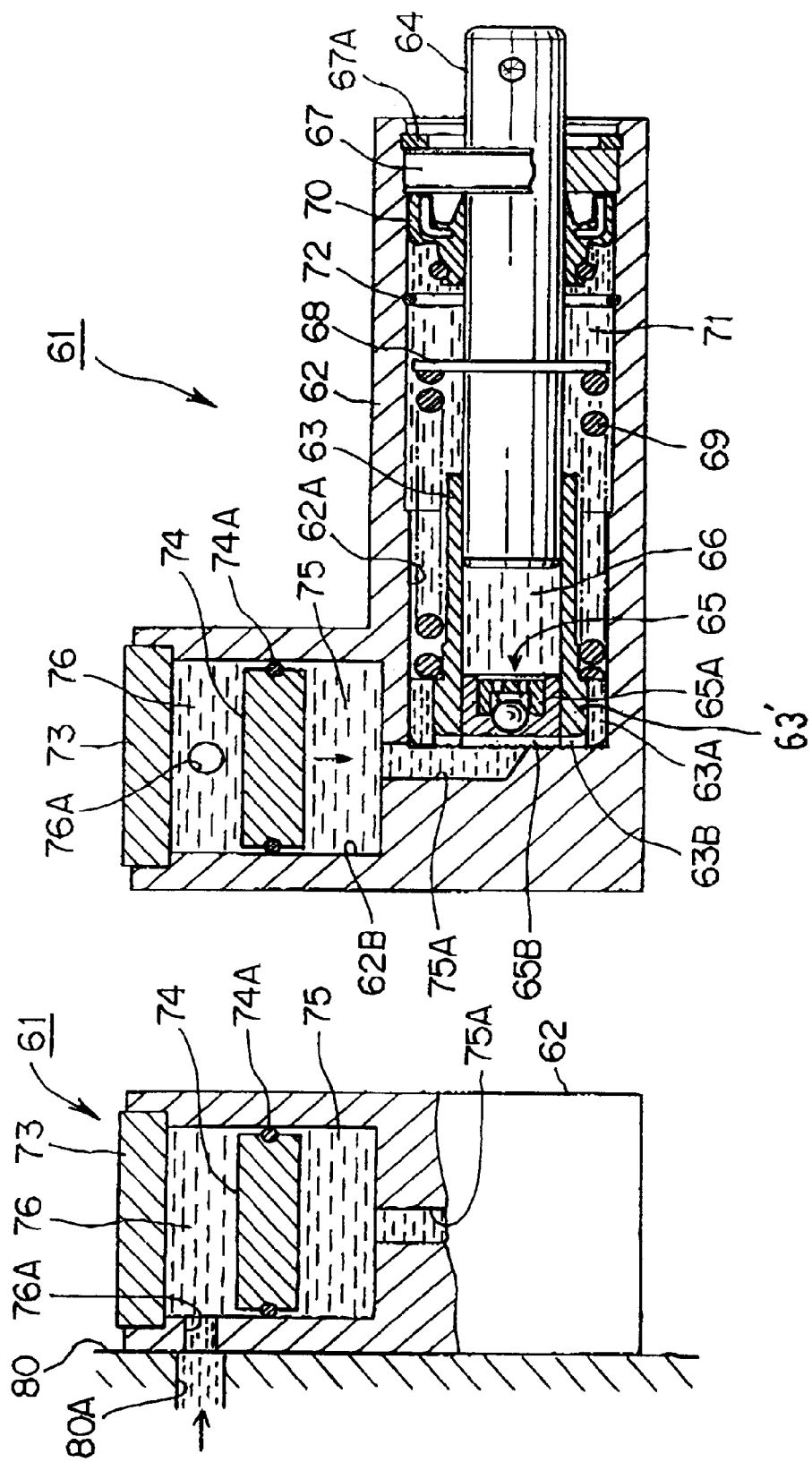
FIG. 1A is a side view, with parts broken away for clarity, of a closed hydraulic tensioner according to a first embodiment of the present invention.
FIG. 1B is a longitudinal cross-sectional view of the hydraulic tensioner.
Figure 3:
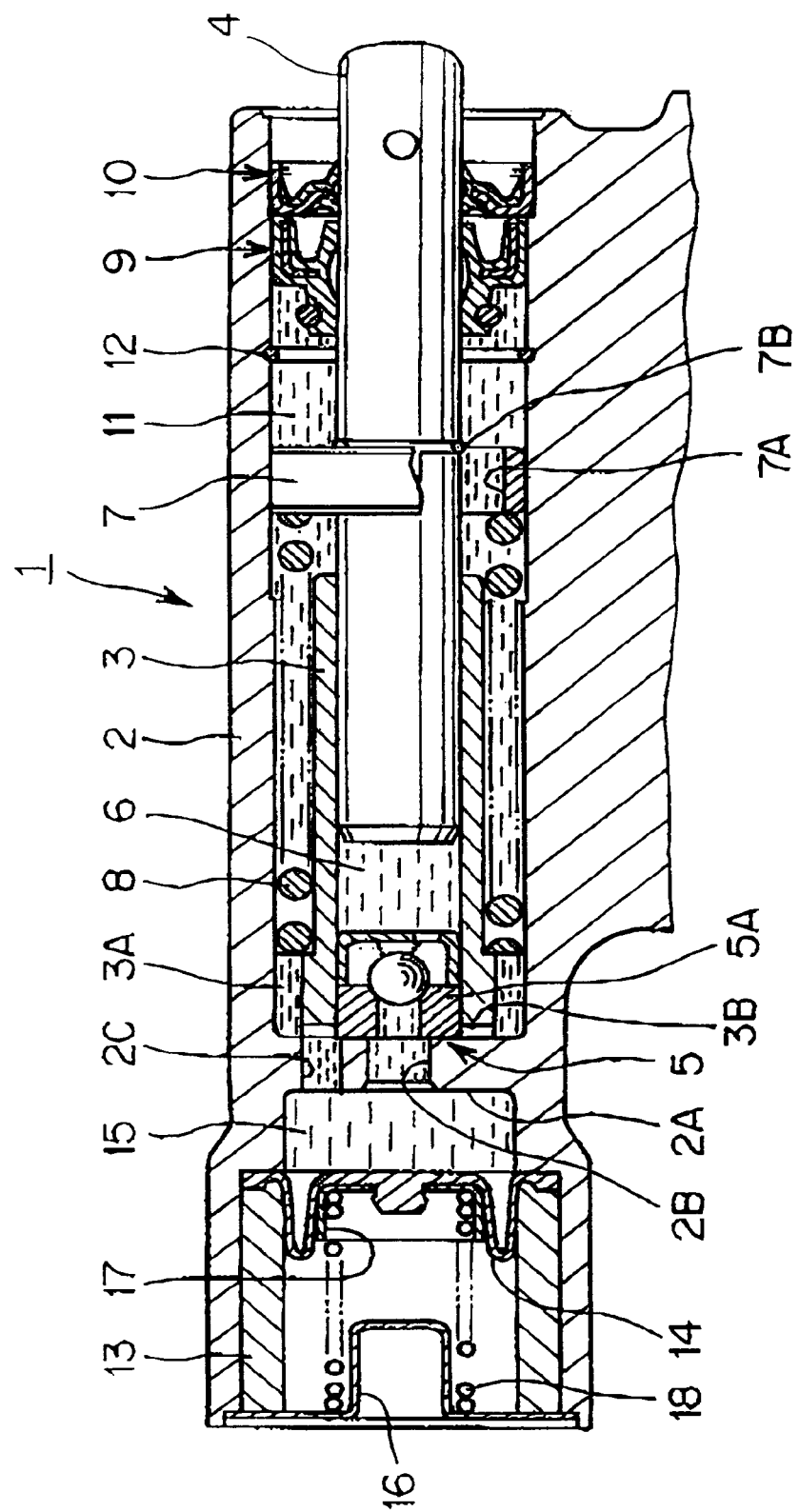
FIG. 3 is a longitudinal cross-sectional view of a main portion of a conventional closed hydraulic tensioner.
Figure 4:
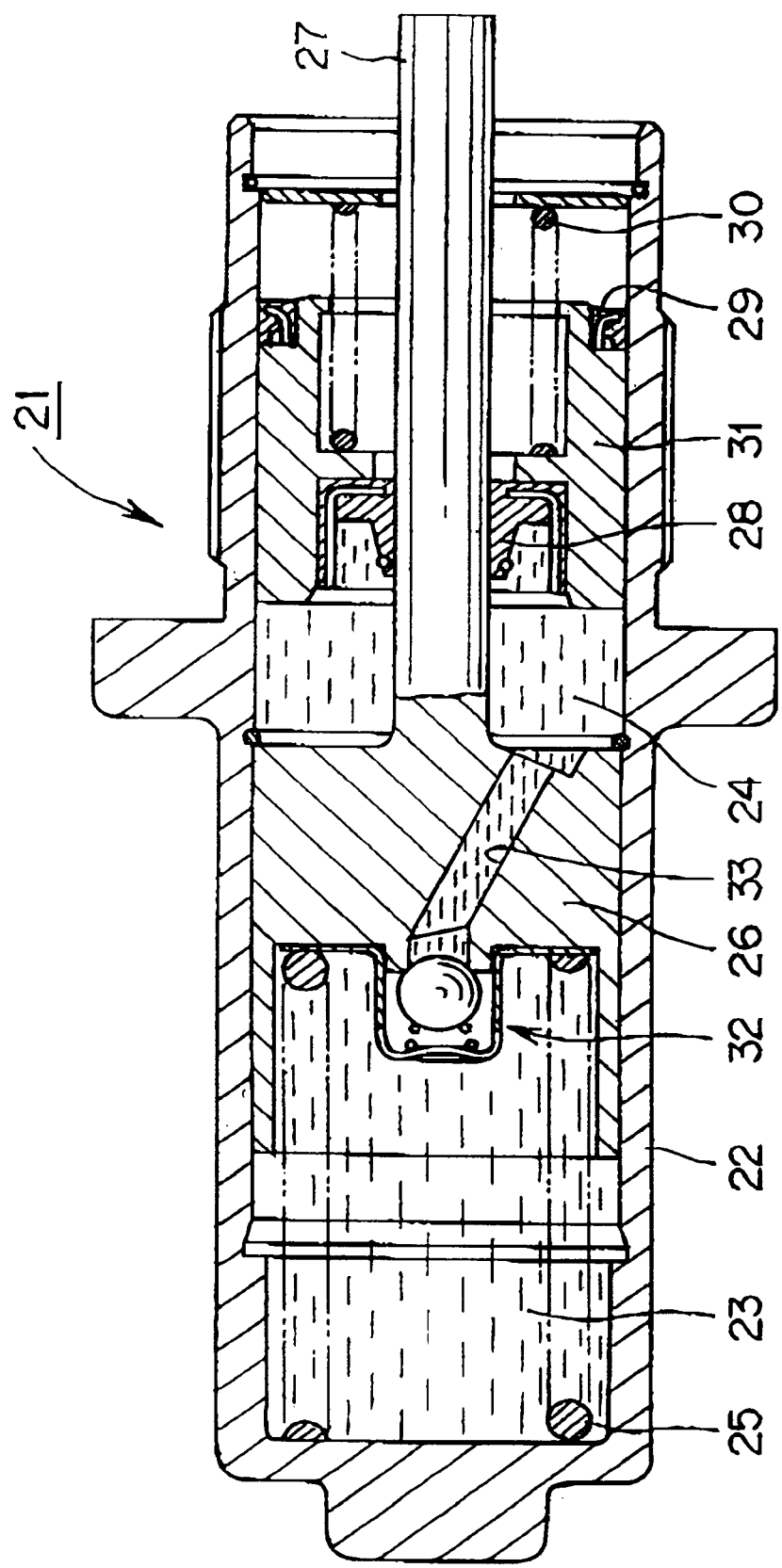
FIG. 4 is a longitudinal cross-sectional view of a main portion of another conventional closed hydraulic tensioner.

Certain preferred embodiments of the present invention will be described with reference to the accompanying drawings wherein like reference characters designate like or corresponding parts throughout the several views.

FIGS. 1A and 1B show a closed hydraulic tensioner according to a first embodiment of the present invention. As shown in these figures, the hydraulic tensioner 61 includes a housing 62, a flanged cylinder 63 mounted in the housing 62, and a piston rod 64 slidably fitted in the flanged cylinder 63 from one end thereof, with a small gap or clearance defined between the cylinder 63 and the piston rod 64.

A check valve 65 includes a ball seat 65A press-fitted in the other end of the flanged cylinder 63 so that a high-pressure chamber 66 is defined interiorly of the flanged cylinder 63. A circular rod guide 67 is attached by a stop ring 67 to an open end portion of the housing 62 so as to guide the piston rod 24 in alignment with the axis of the cylinder 63. An ring-like spring retainer 68 is attached to a longitudinal central portion of the piston rod 64. A compression coil spring 69 is disposed in a pre-loaded or compressed condition between the spring retainer 68 and an annular flange 63' of the flanged cylinder 63 so that the piston rod 64 is urged by the spring 69 in a direction to project from the housing 62.

The housing 62 is generally L-shaped and has a blind hole 62A extending in a horizontal base of the L-shaped housing 62. The flanged cylinder 63 is disposed in the blind hole 62A with an end face of the flange 63' being held in abutment with the bottom of the blind hole 62A. An oil seal 70 is disposed between an outer circumferential surface of the piston rod 64 and an inner circumferential surface of the blind hole 62A of the housing 62. The oil seal 70 is disposed adjacent to the rod guide 67. The piston rod 64, flanged cylinder 63 and housing 62 jointly define therebetween a space 71, and this space 71 forms a low-pressure chamber. A second stop ring 72 is attached to the inner circumferential surface of the blind hole 62A and located behind the oil seal 70. The stop ring 72 limits the forward stroke of the spring retainer 68.

The flange 63' of the flanged cylinder 63 has two axial oil grooves or passages 63A formed in an outer circumferential surface thereof and spaced at an angle of 180 degrees. The flange 63' further has two radial oil grooves or passages 63B formed in the end face thereof and spaced at an angle of 180 degrees. The radial oil passages 63B are connected at one end to one end of the axial oil passages 63A, the other end of the axial oil passages 63A communicating with the low-pressure chamber 71. An end face of the valve seat 65A also has a radial oil groove or passage 65B connected at opposite ends with the other end of the radial oil passages 63B of the flanged cylinder 63.

The L-shaped housing 62 further has a second blind hole 62B extending in a vertical stem of the L-shaped housing 62. The second blind hole 62B extends substantially at a right angle to the blind hole 62A and has an open end facing upward and closed by an end plug 73. A free piston 74 equipped with a packing 74A such as an O-ring is disposed in the second blind hole 62B and separates the hollow interior of the second blind hole 62B into two parts; one being a reservoir 75 extending below the free piston 74, and the other being a pressure chamber 76 extending above the free piston 74. The bottom of the blind hole 62B is formed with an oil passage 75A connected to the radial oil passage 65B formed in the end face of the ball seat 65A of the check valve 65. The pressure chamber 76 has an oil supply hole 76A. The oil supply hole 76A is connected to an oil discharge hole 80A (FIG. 1A) formed in an engine block 80 when the closed hydraulic tensioner 61 is mounted to the engine block 80. The high-pressure chamber 66, the low-pressure chamber 71 and the reservoir 75 are previously filled with an oil sealed therein. The low-pressure chamber 71 communicates with the reservoir 75 through the axial and radial oil passages 63A and 63B of the flanged cylinder 63, the oil passage 65B of the valve seat 65, and the oil passage 75A of the housing 62. An oil from an oil pump (not shown) of engine is supplied from the oil discharge hole 80A through the oil supply hole 76A into the pressure chamber 76 so as to displace the free piston 74 toward the reservoir 75 to thereby compress or pressurize the oil within the reservoir 75.

The closed hydraulic tensioner 61 of the foregoing construction operates as follows.

When a shoe (not shown) is subjected to an impact force applied from a belt or a chain (not shown), the piston rod 64 moves backward against the force of the spring 69. The backward movement of the piston rod 64 raises the hydraulic pressure inside the high-pressure chamber 66 to thereby close the check valve 65. Thus, the oil inside the high-pressure chamber 66 leaks out to the low-pressure chamber 71 through the small clearance defined between the outer circumferential surface of the piston rod 64 and the inner circumferential surface of the flanged cylinder 63. By a flow resistance produced when the oil passes through such small clearance between the piston rod 64 and the cylinder 63, the impact force applied from the belt or chain to the shoe is dampened or otherwise absorbed.

When the piston rod 64 moves forward in the projecting direction by the force of the spring 69, the oil inside the reservoir 75 is introduced through the check valve 65 into the high-pressure chamber 66. In this instance, since the amount of oil held inside the reservoir 75 decreases, the pressure of oil supplied from the oil pump of the engine to the pressure chamber 76 displaces the free piston 74 toward the reservoir 75 so as to follow up the change in content volume of the reservoir 75.

It will be appreciated that the closed hydraulic tensioner 61 of the foregoing embodiment has a pressure chamber 76 disposed next to the reservoir 75, with a free piston (movable member) 74 disposed between the pressure chamber 76 and the reservoir 75, so as to pressurize the oil held inside the reservoir 75, the pressure chamber 76 being supplied with an oil fed from the outside of the tensioner 61.

According to the first embodiment described above with reference to FIGS. 1A and 1B, the oil flows smoothly into both the high-pressure chamber 66 and the low-pressure chamber 71 without being mixed with outside air so that a sufficient damping operation can be achieved. In addition, since the free piston 74 does not require a loading spring, it is possible to reduce the overall size and weight of the tensioner. Further, by the omission of the loading sprig, a corresponding cost reduction can be achieved. The tensioner does not consume the oil in the engine, so that the engine can exhibit the prescribed performance characteristics and is allowed to use a small-capacity oil pump.

FIGS. 2A and 2B show a closed hydraulic tensioner 61' according to a second embodiment of the present invention. The tensioner 61' is substantially the same in structure and function as the tensioner 61 of the first embodiment shown in FIGS. 1A and 1B with the exception that the movable member disposed between the pressure chamber 76 and the reservoir 75 comprises a diaphragm 74' secured to the housing 62 by means of a diaphragm clamp 73'. The diaphragm clamp 73' is in the form of a cup and serves also as an end plug fitted in the blind hole 62B to close an open end of the blind hole 62B.

Obviously, various minor changes and modifications of the present invention are possible in the light of the above teaching. It is therefore to be understood that within the scope of the appended claims, the present invention may be practiced otherwise than as specifically described.

What is claimed is:

1. A closed hydraulic tensioner comprising:

a housing having a first blind hole and a second blind hole extending at an angle to said first blind hole, said second blind hole having an open end facing upward;

a cylinder mounted in said first blind hole in said housing;

a piston rod having one end portion slidably fitted in said cylinder with a small clearance defined therebetween and the opposite end portion projecting outward from said housing;

a spring acting between said cylinder and said piston rod to urge said piston rod and in one direction to project from said housing;

an oil seal disposed between an outer circumferential surface of said piston rod and an inner circumferential surface of said first blind hole in said housing, there being defined between said housing, said cylinder, said piston rod and said oil seal a low-pressure chamber;

a check valve provided at one end of said cylinder so as to define, jointly with the cylinder and said one end of said piston rod, a high-pressure chamber;

an end plug fitted in said second blind hole to close the open end of said second blind hole; and a movable free piston disposed in said second blind hole and separating the interior of said second blind hole into a reservoir on one side of said movable piston and a pressure chamber on the other side of said movable piston;

said low-pressure chamber, said high-pressure chamber and said reservoir being filled with oil sealed in said hydraulic tensioner, said reservoir communicating with said low-pressure chamber and also communicating with said high-pressure chamber via said check valve, said pressure chamber being supplied with an oil from the exterior of said hydraulic tensioner, said movable piston being displaceable toward said reservoir under the pressure in said pressure chamber when the oil in the reservoir is caused to flow into said low-pressure chamber in response to movement of said piston rod in said one direction.

* * * * *